Feb. 8, 1927.
C. J. SWANSTROM
SAWING DEVICE
Filed Sept. 8, 1925
1,616,880
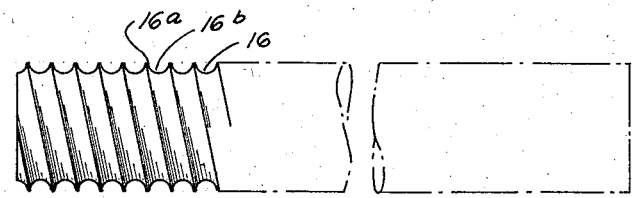
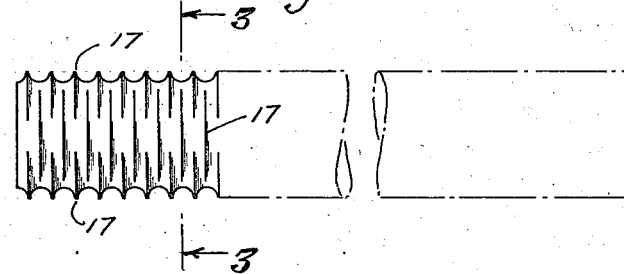
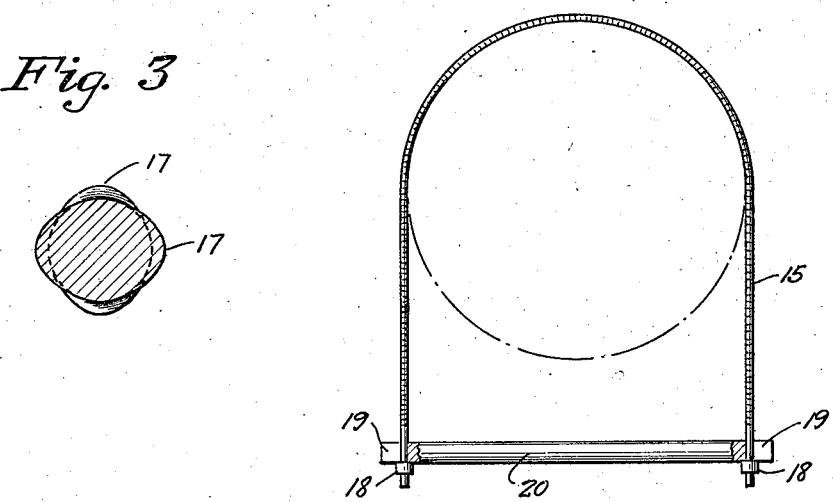
INVENTOR.
Charles J. Swanstrom
BY Munn & Co.
ATTORNEYS.

Patented Feb. 8, 1927.

1,616,880

UNITED STATES PATENT OFFICE.

CHARLES J. SWANSTROM, OF CORONADO BEACH, CALIFORNIA.

SAWING DEVICE.

Application filed September 8, 1925. Serial No. 55,096.

My invention relates to sawing devices for wood and other relatively soft materials, and a purpose of my invention is the provision of a sawing device which is resilient or flexible to permit of its being conformed to the contour of objects to be sawed of various shapes, to have sawing engagement therewith so that when reciprocated it will function to saw the object which it is embracing.

I will describe only one form of sawing device embodying my invention, and will point out the novel features thereof in the appended claims.

In the accompanying drawings—

Figure 1 is a view showing in side elevation a length of resilient material illustrating the first step in the formation of a sawing device;

Figure 2 is a view similar to Figure 1, illustrating the second and final step in the making of the sawing device;

Figure 3 is a transverse sectional view taken on the line 3—3 of Figure 2;

Figure 4 is a plan view of the completed sawing device in applied position with respect to a circular object to be sawed.

Referring specifically to the drawings, in which similar reference characters refer to similar parts in each of the several views, my invention in its present embodiment comprises an elongated body 15 substantially in the form of a wire and constructed of resilient material. The body, prior to being subjected to the threading operations, is of circular form in cross section, and with a smooth and uninterrupted surface, as illustrated by the dot and dash lines in Figures 1 and 2. To construct the sawing device the body 15 is subjected to a threading operation to form a right hand spiral thread 16, as clearly illustrated in Figure 1. The construction of the thread is such as to form relatively pointed crests 16$^a$ and arcuate intervening valleys 16$^b$.

Following this step, the body is now subjected to a second threading operation to form a left hand spiral thread in such manner that the convolutions thereof intersect the convolutions of the right handed thread to form teeth 17 at the points of intersection, each tooth being circumferentially rounded and sharp-edged, and the edge of each tooth being virtually in a plane at right angles to the axis of the body, as shown in Figs. 2 and 3, so as to enable the tooth to cut equally well in either direction longitudinally of the body. In this manner a plurality of series of aligned teeth are formed about the entire body so that the roots of the teeth of one series extend between the roots of the teeth of the adjacent series in order to present a plurality of toothed surfaces and thus permit the presentation of any surface to an object to be sawed, as will be understood.

As shown in Figure 4, the ends of the body 15 are threaded to receive nuts 18 for retaining the body ends within the slotted ends 19 of an operating bar 20. In the present instance I have shown the sawing device applied to a circular object 21, which may be a tree trunk, although it is to be understood that the device can be applied to objects of different shapes and manipulated to effect sawing of the same.

In the operation of the sawing device as illustrated in Figure 4, the saw can be reciprocated by alternately pulling the ends of the operating bar 20, thereby imparting a reciprocating motion to the device to cause its toothed surfaces to have sawing engagement with the object. It will be understood that during this sawing operation the device penetrates the object and that it automatically constricts itself to the reduced diameter of the object while continuing the reciprocating motion thereof.

With the foregoing operation it will be manifest that a saw constructed in accordance with my invention is capable of being flexed to conform to the contour of an object to be sawed, irrespective of its shape, and that when in such conforming position the sawing of the object can be effected by imparting a reciprocating movement to the device.

While I have herein shown and described only one form of sawing device embodying my invention, it will be understood that various changes may be made in the construction and operation thereof without departing from the invention, as long as such changes come within the spirt and scope of the appended claims.

I claim:

1. A sawing device comprising an elongated resilient body of substantially circular form in cross section and having its surface formed with a plurality of series of aligned teeth, each of said teeth being circumferentially rounded and sharp-edged, and the edge of each tooth being virtually in a plane at right angles to the axis of the body, and the roots of the teeth of one series extending between the roots of the teeth of the adjacent series, as, and for the purpose, set forth.

2. A sawing device comprising an elongated resilient body of substantially circular form in cross section and having its surface formed with a plurality of series of aligned teeth, each of said teeth being circumferentially rounded and sharp-edged, and the edge of each tooth being virtually in a plane at right angles to the axis of the body, and the roots of the teeth of one series extending between the roots of the teeth of the adjacent series; and an operating bar associated with the ends of the body, as, and for the purpose, set forth.

CHARLES J. SWANSTROM.